United States Patent
Curtis et al.

(10) Patent No.: US 10,221,882 B1
(45) Date of Patent: Mar. 5, 2019

(54) FASTENER APPARATUS WITH SELF-LEVELING HEAD

(71) Applicant: Dream Weaver, LLC, Sparks, NV (US)

(72) Inventors: David A. W. Curtis, Truckee, CA (US); Marshall W. Curtis, Clearlake, CA (US)

(73) Assignee: Dream Weaver, LLC, Sparks, NV (US)

( * ) Notice: Subject to any disclaimer, the term of this patent is extended or adjusted under 35 U.S.C. 154(b) by 137 days.

(21) Appl. No.: 15/268,099

(22) Filed: Sep. 16, 2016

Related U.S. Application Data

(62) Division of application No. 14/260,673, filed on Apr. 24, 2014, now Pat. No. 9,447,814.

(51) Int. Cl.
  *F16B 43/02* (2006.01)
  *F16B 5/02* (2006.01)
  *F16B 43/00* (2006.01)

(52) U.S. Cl.
  CPC .............. *F16B 43/02* (2013.01); *F16B 5/025* (2013.01); *F16B 43/001* (2013.01)

(58) Field of Classification Search
  CPC ......... F16B 43/02; F16B 43/001; F16B 35/06
  USPC ......... 411/369, 371.1, 371.2, 537, 542, 380; 52/410
  See application file for complete search history.

(56) References Cited

U.S. PATENT DOCUMENTS

| | | | |
|---|---|---|---|
| 932,342 A * | 8/1909 | Smith | F22B 7/16 |
| | | | 122/493 |
| 1,352,918 A | 9/1920 | Rohbock | |
| 3,149,850 A | 9/1964 | Artur | |
| 3,241,422 A * | 3/1966 | Heimovics | F16B 33/004 |
| | | | 411/371.1 |
| 3,422,721 A | 1/1969 | Yonkers | |
| 3,606,357 A | 9/1971 | Yonkers | |
| 3,788,185 A | 1/1974 | Gutshall | |
| 3,882,752 A | 5/1975 | Gutshall | |
| 3,889,569 A * | 6/1975 | Fanciullo | F16B 33/004 |
| | | | 411/369 |
| 4,292,876 A * | 10/1981 | De Graan | F16B 43/001 |
| | | | 411/369 |
| 4,362,449 A | 12/1982 | Hlinsky | |
| 4,686,808 A | 8/1987 | Triplett | |
| 4,860,513 A | 8/1989 | Whitman | |
| 5,168,684 A | 12/1992 | Bruhm | |
| 5,534,027 A | 7/1996 | Hodorek | |
| 5,667,347 A | 9/1997 | Matthews | |
| 6,282,857 B1 | 9/2001 | Rubenacker | |
| 6,764,262 B1 | 7/2004 | Hargis | |
| 7,329,077 B2 | 2/2008 | Curtis et al. | |
| 7,850,410 B1 | 12/2010 | Curtis et al. | |
| 8,708,630 B1 | 4/2014 | Curtis et al. | |

(Continued)

*Primary Examiner* — Flemming Saether
(74) *Attorney, Agent, or Firm* — Charles L. Thoeming

(57) ABSTRACT

Fastener apparatus including a self-adjusting and automatically self-leveling head separate from a threaded shank portion. An embodiment self-leveling head portion defines an annular recess and lip portion sized to receive a seal. A threaded shank resides within an annular cup center of the self-leveling head and has a thread-free portion seated by the compressed seal creating a water tight seal. Embodiments for sheet metal screw and bolt fasteners not requiring seals are disclosed.

15 Claims, 14 Drawing Sheets

(56) References Cited

U.S. PATENT DOCUMENTS 9,447,814 B1    9/2016   Curtis et al.
2004/0052610 A1   3/2004   Kaupanger

* cited by examiner

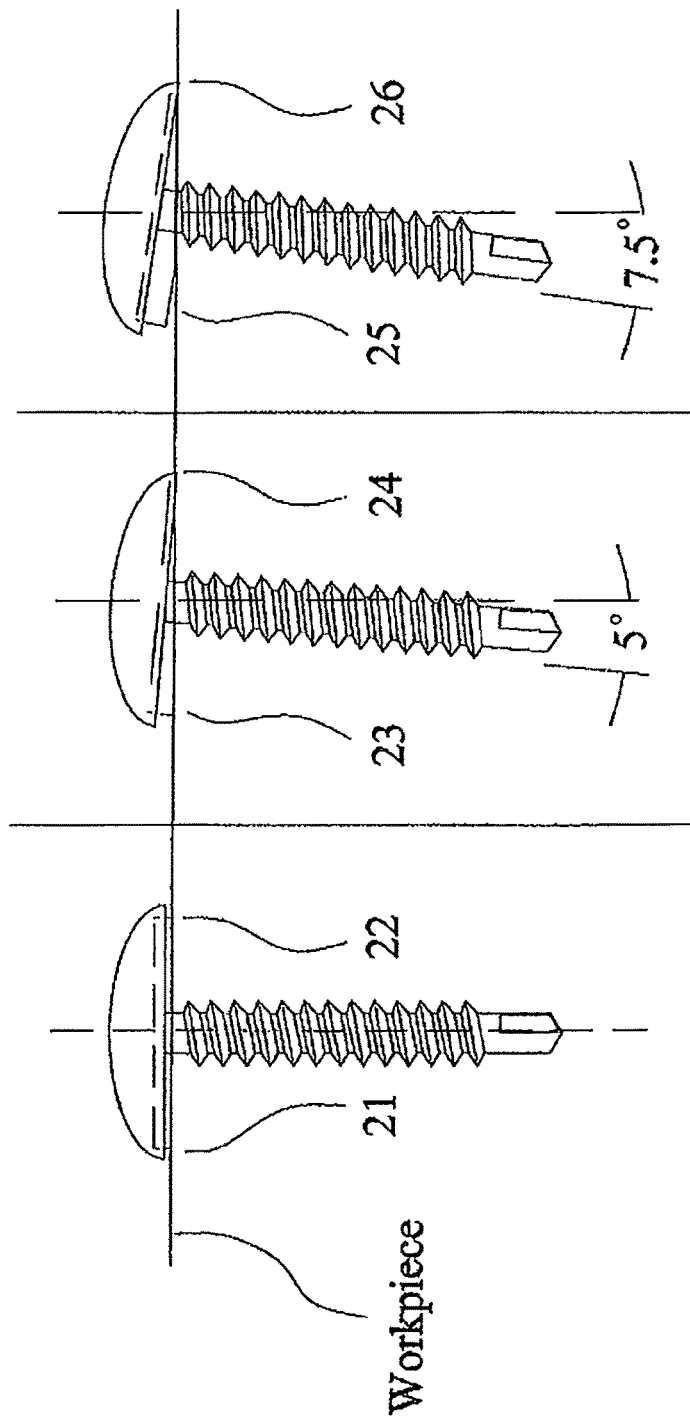

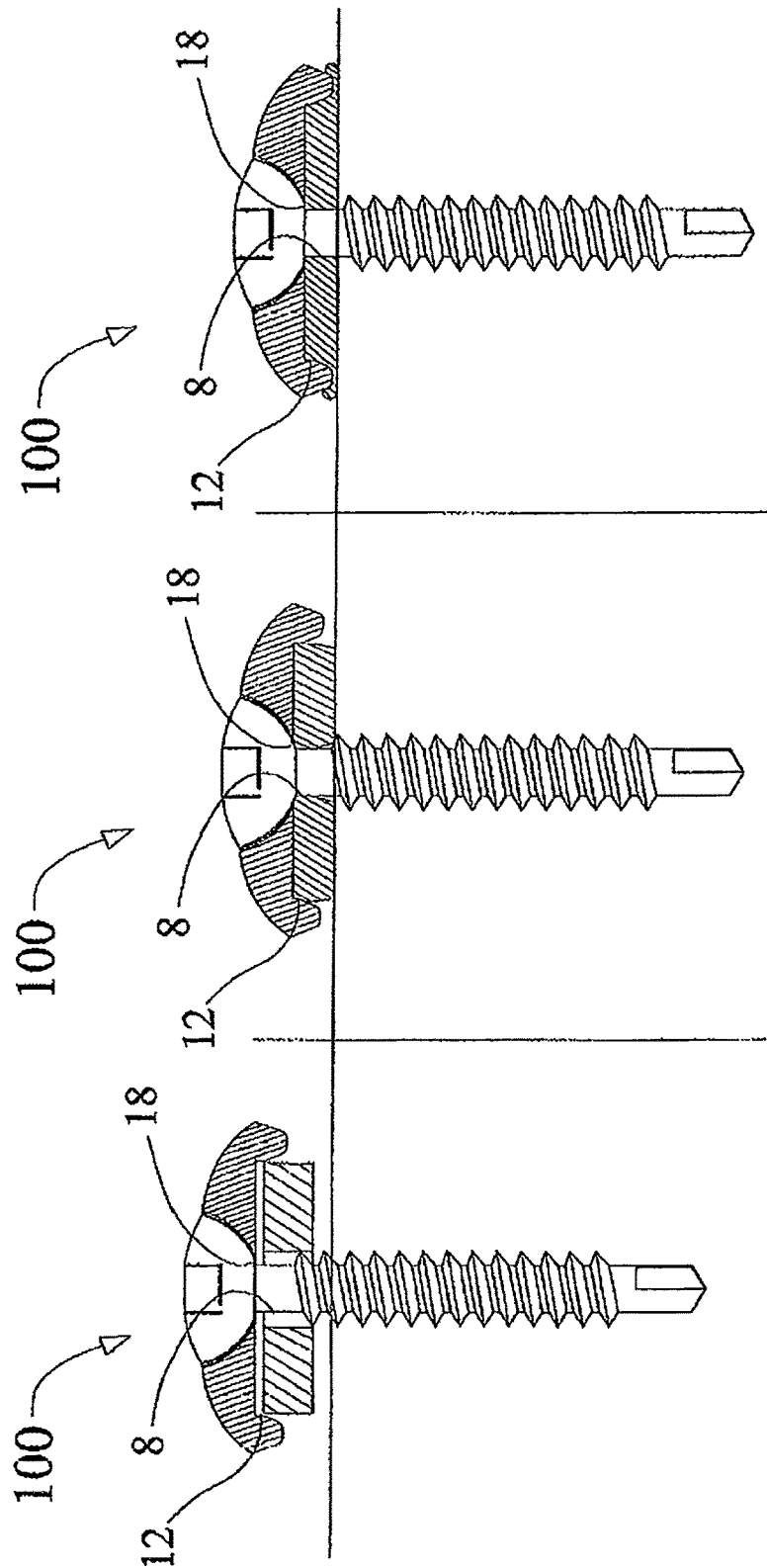

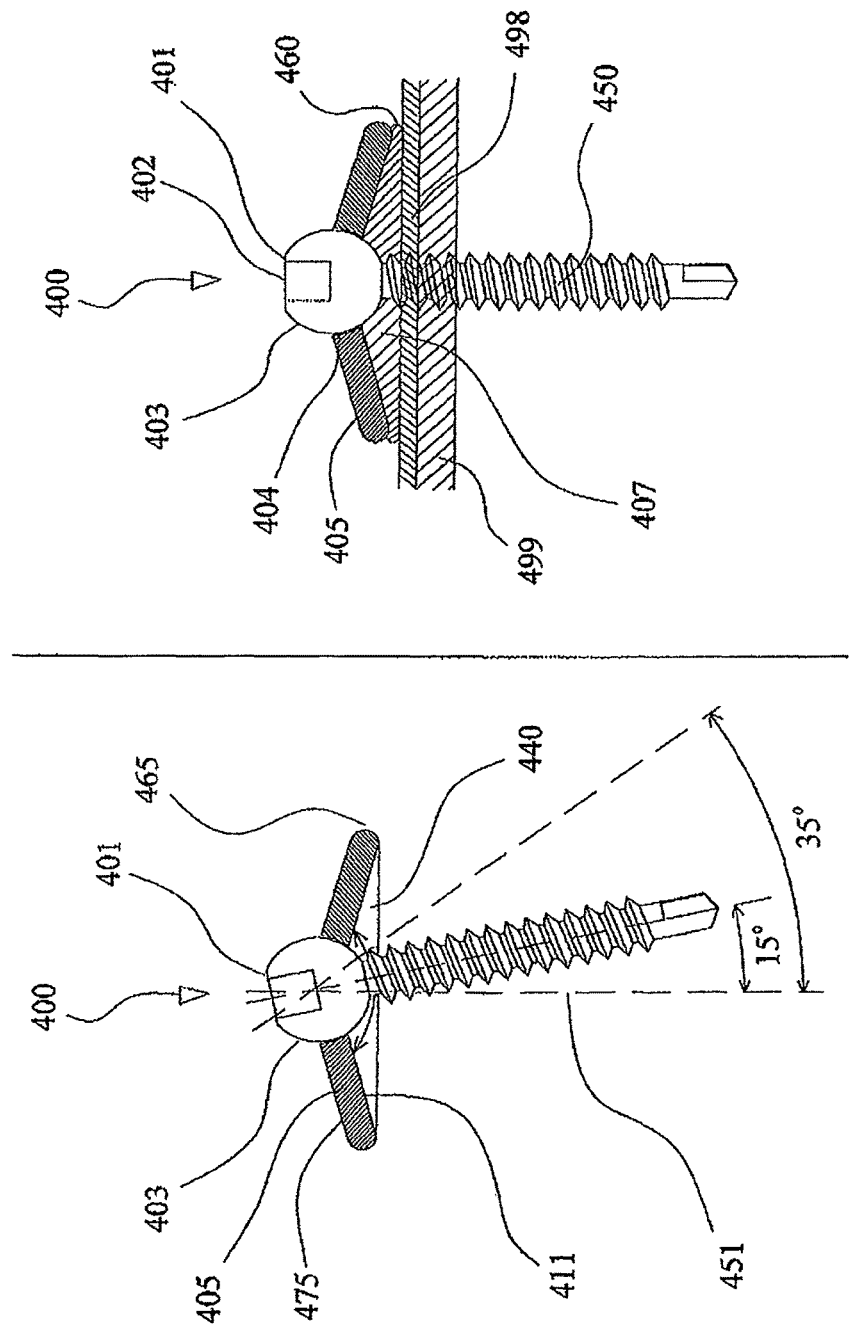

FASTENER APPARATUS WITH SELF-LEVELING HEAD

CROSS-REFERENCES TO RELATED APPLICATIONS

This non-provisional patent application is a divisional patent application, and claims the benefit, of U.S. non-provisional patent application Ser. No. 14/260,673, filed Apr. 24, 2014 (the '673 Application), presently scheduled to issue as U.S. Pat. No. 9,447,814 on Sep. 20, 2016. The '673 Application was a divisional patent application from U.S. non-provisional patent application Ser. No. 13/416,153, filed Mar. 9, 2012 (the '153 Application), which issued as U.S. Pat. No. 8,708,630 B1 on Apr. 29, 2014. The '153 Application was a divisional patent application from U.S. non-provisional patent application Ser. No. 12/138,677, filed Jun. 13, 2008 (the '677 Application). The '677 Application was a continuation-in-part of U.S. non-provisional patent application Ser. No. 11/732,865, filed Apr. 4, 2007 (the '865 Application), which issued Dec. 14, 2010, as U.S. Pat. No. 7,850,410 B1.

STATEMENT REGARDING FEDERALLY SPONSORED RESEARCH OR DEVELOPMENT

None.

REFERENCE TO A MICRO-FICHE APPENDIX

None.

BACKGROUND OF THE INVENTION

Field of the Invention

The present invention relates generally to construction hardware, and more particularly to an improved fastener apparatus for metal roofing and steel building construction.

Description of the Related Art

Fasteners for use in roofing and steel building construction presently include the ring shank, self-sealing nail and the self-sealing hex head. Manufacturers of these fasteners recommend replacement of the installed fasteners every five years. This recommended replacement schedule is necessitated by damage to the exposed rubber seals used for these fasteners by ultraviolet rays. Additionally, the gravitational shearing forces of ice and snow on roofing surfaces employing the hex head builds up against the hex head vertical walls, loosening the fasteners and causing damage to the fasteners and their seals.

U.S. Pat. No. 6,764,262 discloses and claims a weatherproof fastener comprising a shank and head, wherein the head further comprises a recessed lower surface. A gasket is positioned in the recess and, as the fastener is employed to join two elements, the gasket is compressed to entirely fill the recess to prevent ingress of undesirable materials. The U.S. Pat. No. 6,764,262 patent fails to address or protect situations where the fastener is applied at any off angle other than ninety degrees, since the solid connection between the shank and the head create a solid "T" shape. When the fastener of the U.S. Pat. No. 6,764,262 patent is applied at an off angle, one head side contacts the workpiece while the opposing head side rises up creating a gap between the workpiece and the head outer rim. This gap provides ingress of undesirable materials to the head underside, and eventual fastener failure.

The foregoing patent and/or products reflect the current state of the art. Reference to, and discussion of, these patent and/or products is intended to aid in discharging Applicants' duty of candor in disclosing information relevant to the examination of claims of this application. It is respectfully submitted, however, that none of the above-indicated patent and/or products disclose, teach or suggest, motivate, show or otherwise render obvious, either singly or when considered in combination, the novel invention disclosed and claim in this application.

BRIEF SUMMARY OF THE INVENTION

The present invention provides an improved fastener apparatus for use in roofing and steel building construction. The inventive fastener provides a self-adjusting and automatically self-leveling head which is separate from the threaded shank portion. This self-leveling head provides a frusto-hemispherical head, a curved outer surface, a base, a peripheral edge, and a rounded annular cup center. The rounded annular cup center is wider and having near vertical sides at the uppermost portion, and curves and narrows towards a nearly horizontal surface at the lower portion. The cup center is sized and designed to receive a separate threaded shank inserted through the separate head.

The threaded shank has threads leading to a threadless tip at one end and a rounded ball shank at the other end, and a flat top surface bearing a tool fitting.

The combined annular cup head and rounded ball shank create a free moving ball joint which allows the free moving head to self-level under compression of installation regardless of the angle of installation of the threaded shank. The head has a downwardly-appending lip which extends from the head peripheral edge, thus defining an annular recess in the base. The annular recess comprises a flat upper surface which transitions to a vertically downwardly-appending lip. The vertically downwardly-appending lip transitions into an annular wall at approximately 100- to 110-degrees to the horizontal, and ends in a curved lowermost bottom of the annular lip. The bottom of the lip is substantially flat and transfers into an upwardly-appending peripheral edge sloping outwardly at approximately 110 degrees from the horizontal, and then transfers into the frusto-hemispherical head. The recesses and downwardly appending lip are sized to receive a sealing gasket which seats around the threadless top of the shank to create a water tight seal.

The self-leveling head prevents the fastener head perimeter and downwardly-appending lip from scratching a painted workpiece during installation. The sealing gasket contacts the workpiece as it is being fastened and begins to compress and provide resistance. In this manner, the remaining uncompressed portion of the gasket seal contacts the workpiece and adjusts the free-moving head to a level position before final compression of the gasket seal occurs, resulting in a final fastener head position that is flush with the workpiece, yet level to the horizontal plane.

A second thin sealing gasket is also inserted between the rounded ball head of the shank and the rounded cup of the free-moving head recess. This second seal gasket provides a barrier between the ball and cup to prevent rusting or electrolysis and to stop any ingress of water into the recess.

The separate heads of the fastener combine to provide one low profile head to reduce friction between the fastener and unloading snow and ice which can shear the fastener head and tear the entire fastener from an installed position.

The lip has six specific features. First, on the lip inside surface, the top twenty percent of the annular recess is vertical in order to catch the top surface of the seal gasket and prevent it from expanding horizontally, thus increasing resistance between the seal gasket and the workpiece to self-level the fastener head. Second, seventy percent of the annular recess wall transitions into a 110 degree sloping wall which widens as it nears the lip bottom, thus allowing the seal gasket to slowly expand and fill the recess. Third, the final ten percent of the annular recess is rounded so that the seal gasket escaping the recess and extending under the lip is not pinched or cut by the inside surface of the recess wall. The bottom-most lip surface is substantially flat and wide to accommodate a portion of the seal gasket and to create a scratch barrier between the lip and the workpiece being fastened. The bottom-most lip surface transitions into a rounded portion which removes any sharp edges that might scratch the workpiece being fastened. The outer peripheral edge slopes up towards the main body of the fastener head at a 110-degree angle. This section creates a horizontal V-shaped cavity which accommodates the excess seal gasket that escapes from the recess to be protected from unloading snow and ice as it resides within the horizontal V-shape created between the workpiece and the peripheral edge at a 110-degree angle of the edge. As such, the recessed lip works in unison with the seal gasket, the workpiece, and the free moving head of the fastener to self-level the head portion regardless of the angle the threaded shank is installed.

As the fastener is installed, the seal gasket within the annular recess first makes contact with the workpiece and is sandwiched between the free moving head and the workpiece being fastened. The seal gasket is slightly compressed and begins to expand outwardly in a horizontal plane. The short top twenty percent vertical wall of the lip is sized to stop the outward expansion of the seal gasket as the seal contacts the vertical recess wall. The seal gasket contact with the vertical wall also creates immediate and increased resistance from the seal which causes the free moving head to self-level. Once the free moving head has self-leveled, the lowermost portion of the seal gasket is allowed to gradually expand along the angled 110-degree mid portion and fill the remaining recess. The extreme bottommost portion of the inner recess wall is rounded and will not damage the seal gasket as it expands at an acceptable rate for the composition of the seal, eventually escaping from the recess and providing a scratch barrier between the fastener head lip and the workpiece being fastened. The substantially flat and wide bottom surface of the lip is designed to accommodate the escaping seal and further aid in the self-leveling of the free moving head and provide a scratch barrier between the lip and the workpiece. The final portion of the downwardly-appending lip is the peripheral edge designed at a 110-degree outward angle to accommodate a small amount of seal gasket which may completely escape from the recess and even beyond the lip portion of the recess to stop the ingress of undesirable materials and water.

The separation of the threaded shank portion with a rounded ball head and the head portion with rounded cup combine and create a ball joint which allows the threaded shank portion to spin during installation while the free moving head portion is held by the installer without the head portion spinning in the installer's fingers. Further, as the head and seal gasket make contact with the workpiece being fastened, the seal gasket contained inside the recess is not subjected to extreme twisting and binding which would damage the seal gasket during installation.

It is, therefore, an object of the fastener apparatus with self-leveling head to provide an improved fastener that can withstand the elements.

It is another object of the fastener apparatus with self-leveling head to provide a new and improved fastener that protects the seal from extreme forces under the installation process including, without limitation, twisting, binding, rolling and heat generated by friction caused during the final seating of installation.

It is yet another object of the present invention to decrease the time required to replace failed concrete surfaces over the art.

It is still yet another object of the fastener apparatus with self-leveling head to provide a new and improved fastener in which the head self-levels and provides a tighter seal in order to stop ingress of undesirable materials under the head not provided by existing solid head-to-shank fasteners.

A further object of the fastener apparatus with self-leveling head to provide a new and improved fastener which will protect the workpiece surface from scratching during installation due to the self-leveling aspect of the separated head and shank.

Yet another object of the fastener apparatus with self-leveling head to provide a new and improved fastener which inhibits rust and electrolysis between the fastener head and the workpiece.

Other novel features, advantages, and objects of the present invention will become apparent with reference to the following description and accompanying drawings. It is to be expressly understood, however, that the drawings are for illustration and description only, and are not intended as definitions of the limits of the fastener apparatus with self-leveling head. The various features of novelty which characterize the fastener apparatus with self-leveling head are pointed out with particularity in the claims annexed to and forming part of this disclosure. The fastener apparatus with self-leveling head resides not in any one of these features taken alone, but rather in the particular combination of all its structures for the specified functions.

There has thus been broadly outlined the more important features of a fastener apparatus with self-leveling head in order that the detailed description thereof that follows may be better understood, and in order that the present contribution to the art may be better appreciated. There are, of course, additional features of the fastener apparatus with self-leveling head that will be described hereinafter and which will form additional subject matter of the claims appended hereto. Those skilled in the art will appreciate that the conception upon which this disclosure is based readily may be utilized as a basis for designing other structures, methods, and systems for carrying out the several purposes of a fastener apparatus with self-leveling head. It is important, therefore, that the claims be regarded as including such equivalent constructions insofar as they do not depart from the spirit and scope of the fastener apparatus with self-leveling head.

Certain terminology and derivations thereof may be used in the following description for convenience in reference only, and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include plural, and vice versa, unless otherwise noted.

BRIEF DESCRIPTION OF DRAWINGS

The fastener apparatus with self-leveling head will be better understood and objects other than those set forth above will become apparent when consideration is given to the following detailed description thereof. Such description makes reference to the annexed drawings.

FIG. 6A is a side elevation view of existing solid connecting head and shank installed vertically in a workpiece.

FIG. 6B is a side elevation view of existing solid connecting head and shank installed at an off angle of 15 degrees from vertical in a workpiece.

FIG. 6C is a side elevation view of existing solid connecting head and shank installed at an off angle of 25 degrees from vertical in a workpiece.

FIG. 7A is a cross-sectional side view of an assembled fastener apparatus with self-leveling head 100 prior to the seal gasket making contact with the workpiece.

FIG. 7B is a cross-sectional side view of an assembled fastener apparatus with self-leveling head 100 as the seal gasket begins to compress and the recess vertical wall 12 causes the gasket to secure itself around the un-threaded top portion 8 of the shank.

FIG. 7C is a cross-sectional side view of an assembled fastener apparatus with self-leveling head 100 depicting the seal gasket in a final, installed position.

FIG. 10A is a side elevation view of an embodiment of fastener apparatus with self-leveling head fully assembled 400.

FIG. 10B is a side elevation view of the embodiment of fastener apparatus with self-leveling head fully assembled 400 of FIG. 10A installed to fasten a workpiece 498 to a substrate 499.

DETAILED DESCRIPTION OF THE INVENTION

Figure 1:
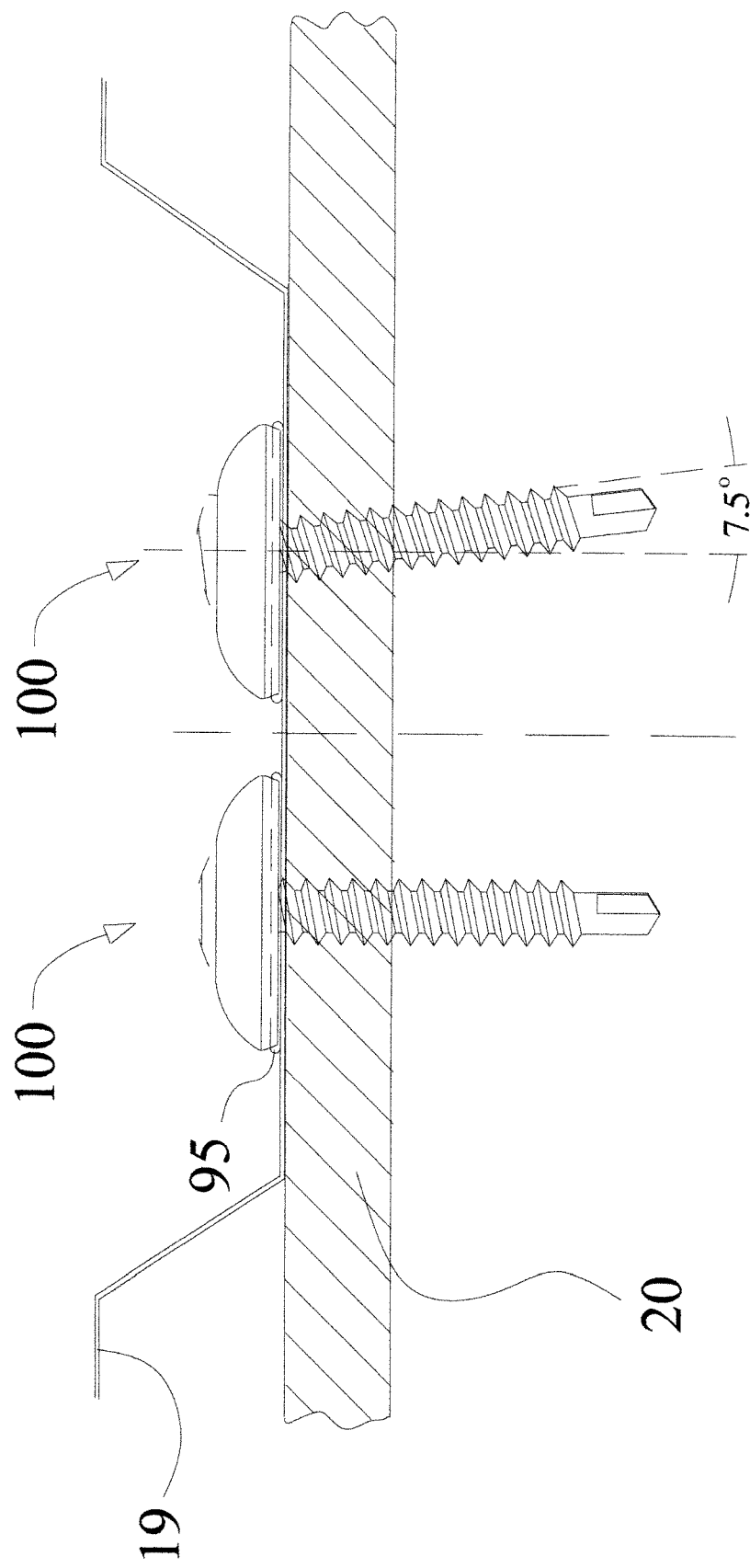
FIG. 1A is a side elevation view of a fastener apparatus with self-leveling head fully assembled 100 installed to fasten a workpiece 19 to a substrate 20.
FIG. 1B is a side elevation view of a fastener apparatus with self-leveling head 100 having a threaded shank portion installed at an off angle of approximately 20 degrees from vertical, wherein the free moving head has self-leveled automatically and equal pressure has been applied to the seal gasket 7.
Figure 2:
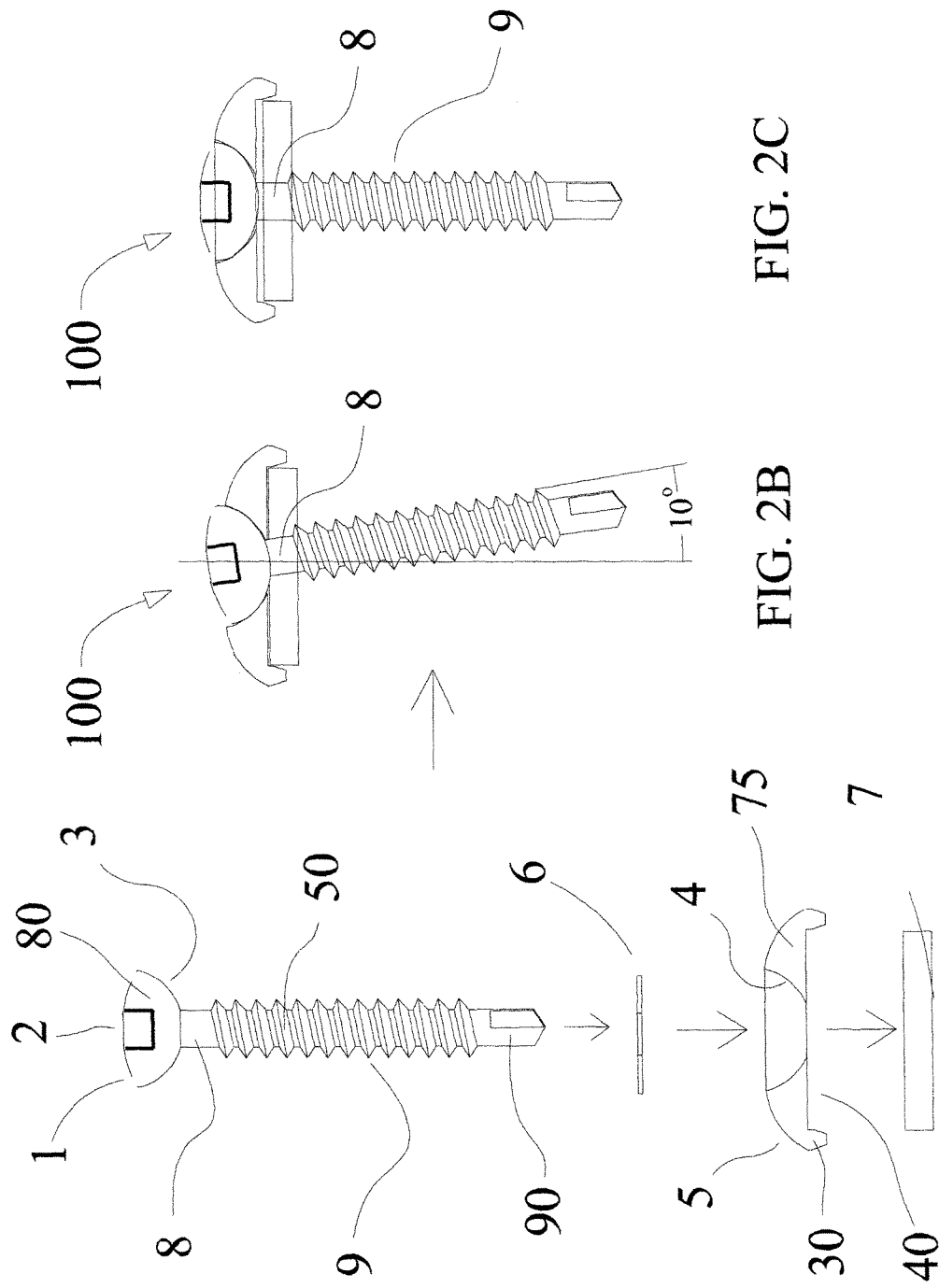
FIG. 2A is an exploded side elevation view of the components of a fastener apparatus with self-leveling head 100.
FIG. 2B is a side elevation view of an assembled fastener apparatus with self-leveling head 100 having a threaded shank portion installed at an off angle of approximately ten degrees from vertical.
FIG. 2C is a side elevation view of an assembled fastener apparatus with self-leveling head 100 having a threaded shank portion installed vertically.

Referring to FIGS. 1A-14, wherein like reference numerals refer to like components in various views, there is a new and improved fastener apparatus, generally denominated 100 herein.

Figure 3:
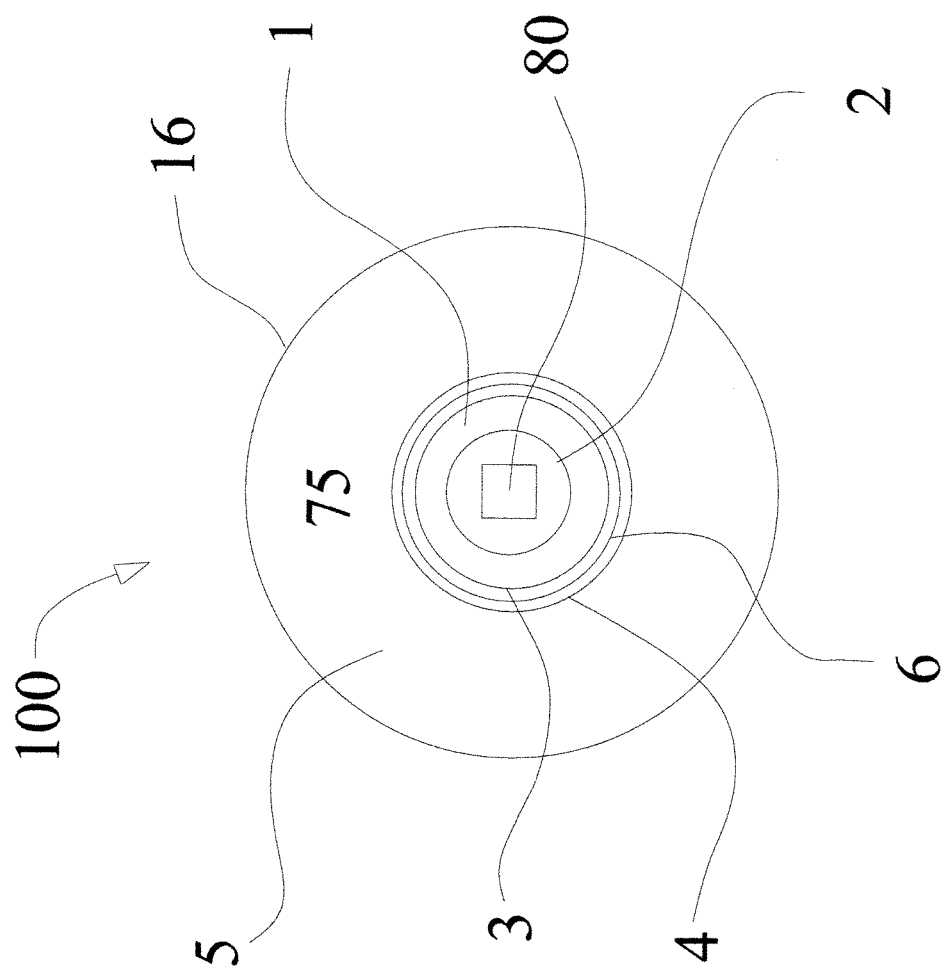
FIG. 3 is a top view of a fastener apparatus with self-leveling head.
Figure 4:
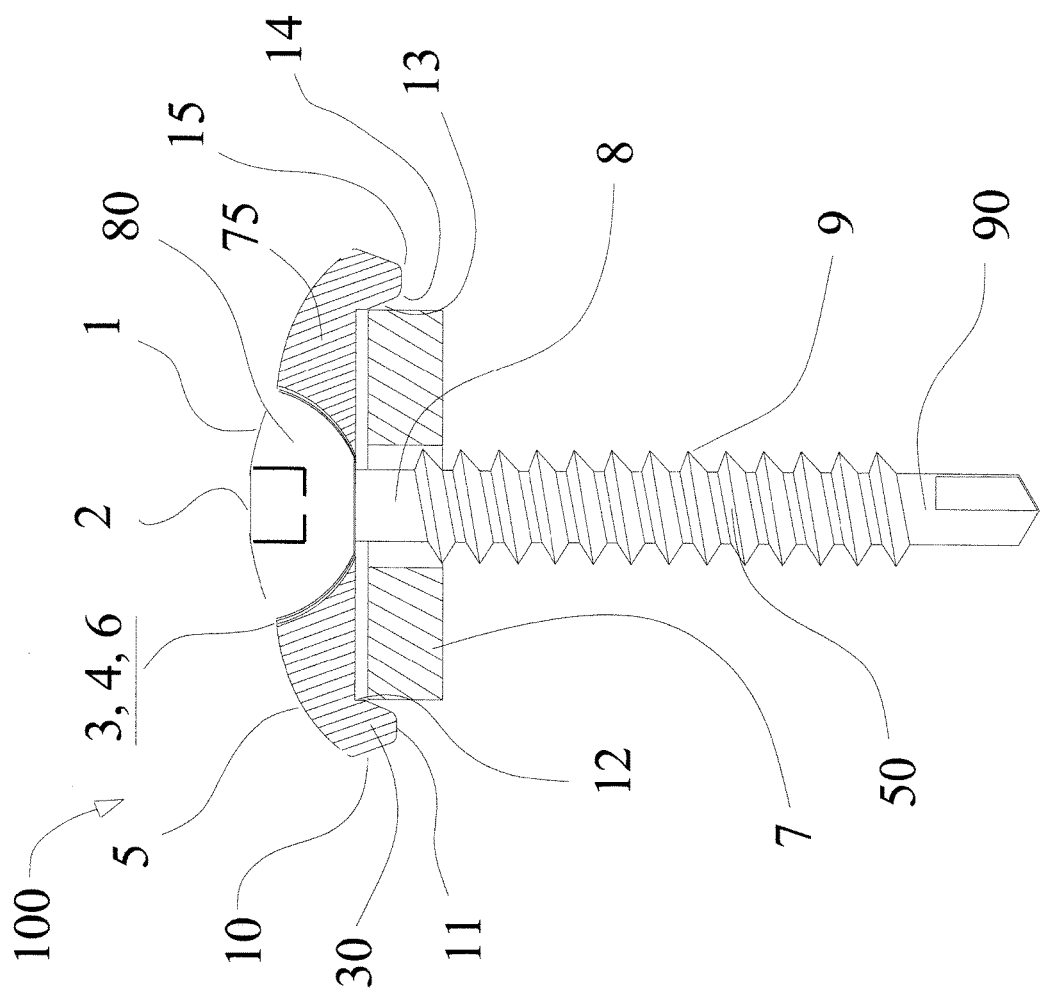
FIG. 4 is a cross sectional side view of an assembled fastener apparatus with self-leveling head 100.
Figure 5:
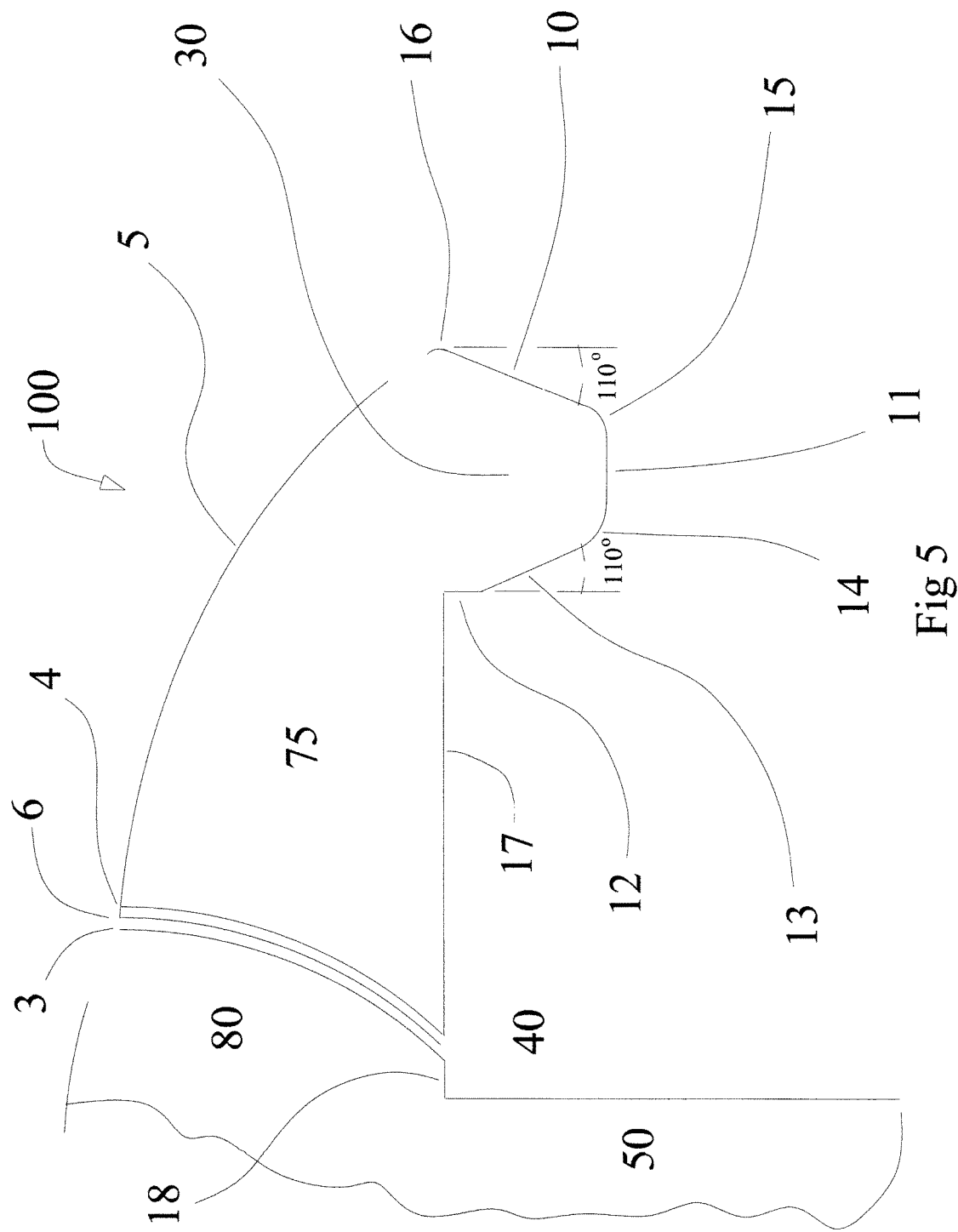
FIG. 5 is an enlarged side elevation view an assembled fastener apparatus with self-leveling head 100 depicting the features of the downwardly-appending lip and annular recessed wall.

FIGS. 1A and 1B provide side elevation views of the fastener apparatus with self-leveling head 100 installed. FIGS. 2A-2C include three cross-sectional elevation views detailing individual components making up the completed fastener apparatus with self-leveling head 100: exploded view unassembled, FIG. 2A; assembled and vertically installed, FIG. 2C; and assembled and installed showing the free-moving, threaded hank at an off angle, FIG. 2B. FIG. 3 is a top plan view of the fastener head. FIG. 4 is a side, cross-sectional view detailing the elements of the fastener apparatus with self-leveling head, and which is the preferred embodiment of the invention for fastener apparatus with self-leveling head. FIG. 5 is a side elevation view in a cross-section and is a close-up of the individual features that create the recessed inner wall and self-leveling elements of the preferred embodiment of the fastener apparatus with self-leveling head. FIGS. 6A-6C are side elevation views and depict an existing one-piece fastener with solid head and shank connection. FIGS. 7A-7C depict the fastener apparatus with self-leveling head being installed and further depict how the recessed wall works in unison with the seal gasket to properly seat under compression.

The fastener apparatus with self-leveling head 100 includes four principal elements: 1) the threaded shank 50; 2) the free moving head 75; 3) a first, upper seal 6; and 4) a second, lower recess seal gasket 7. These elements combine together and create a fastener apparatus with self-leveling head 100.

The threaded shank 50 is inserted through the upper seal 6, and then through the free moving head 75. The threaded shank finally passes through the second, lower recess seal gasket 7, FIGS. 1A-2C, 4, and 7A-7C.

The fastener threaded shank 50 includes a frusto-hemispherical head 1, having a flat top surface 2, bearing a tool fitting, a curved ball bottom 3, a threaded mid-portion 9, and smooth threadless top portion 8 between the threaded mid-portion 9 and curved ball bottom 3 of the frusto-hemispherical head 1, FIGS. 3 and 4. The shank portion 50 is connected to the base 80, and the shank 50 further includes the threaded shank mid-portion 9 and shank tip 90.

Further, the fastener apparatus with self-leveling head 100 includes a free moving head 75, FIGS. 2A, 3 and 4. The free moving head 75 comprises a frusto-hemispherical head 5, a hollow center formed in a rounded cup shape 4, a flat base 17, and a peripheral edge 16. A downwardly-appending lip 30 extends from the peripheral edge 16 and defines an annular recess 40 in the base 17, FIGS. 4 and 5. The annular recess 40 has a flat upper surface created by two pieces defined as threaded mid-shank 50 and the free moving head 75, more particularly identified as 17 and 18, respectively, FIG. 5. The lip 30 has a 110 degree angled outer edge 10, a curved lower edge 15, a substantially wide and flat bottom 11, and an inner edge: ten percent of which is curved at the bottom 14; seventy percent of which is a 110 degree angled mid-section; and twenty percent of which is a vertical upper section 12, terminating in the annular recess flat upper surface 17, FIG. 5.

The threaded shank 50 and the free moving head 75 combine to create a ball joint to allow the fastener to self-level the head regardless of the angle the shank 50 is installed off vertical, FIGS. 3-6. The ball 3 on the head 80 bottom of the shank 50 combines with the cup 4 of the free-moving head 75 and provides a durable head that rotates to any position up to 30-degrees off vertical. This rotational freedom allows the free-moving head 75 to self-level under the compression of installation. The free-moving head 75 also aids the installer to maintain the free-moving head tightly in their fingers without the friction burn from the head spinning while the threaded shank 50 sins inside of the free-moving head 75. Since the free-moving head 75 does not spin, the seal gasket 7 within the annular recess 40 does not spin or bind and the seal gasket 7 is not damaged during installation.

A thin seal 6 is installed between the ball 3 on the head 80 bottom of the shank 50 and the cup 4 of the free-moving head 75 to stop the ingress of water into the ball joint, FIGS. 3-6. In this fashion, rusting and electrolysis of the assembled and installed fastener are prevented, as is the ingress of water into the annular recess 40 through the ball 3 and cup 4. The preferred embodiment of the seal 6 is made from nylon or rubber.

The head 80 of the threaded shank is rounded or convex 1, FIG. 4. The free-moving head 75 external top surface is also convex and low profile to reduce friction between unloading snow and ice and the fastener head to reduce head shear.

The annular recess 40 is designed to accommodate a seal gasket 7 that, when in an uncompressed state, fills the recess from the threaded shank 9 to the vertical wall 12 of the annular recess 40 downwardly-appending lip 30. Under compression, the vertical wall 12 stops the top portion of the seal gasket 7 from expanding laterally from center and causes the seal gasket to compress and close towards the center and seat around the un-threaded top length 8 of the shank 50. The preferred embodiment of the seal gasket 7 is rubber.

The annular mid portion of the recessed wall 13 is at an angle of 110 degrees from the vertical wall, and allows the lower portion of the seal gasket 7 to compress and transition from the inward motion towards the top of the seal to a gradual outward motion along the annular mid portion of the recessed wall 13 of the downwardly-appending lip 30, FIGS. 4 and 5. This design compresses the seal gasket 7 around the smooth upper shank surface 8 to prevent ingress of water through the ball 3 on the head 80 bottom of the shank 50 and the cup 4 of the free-moving head 75 into the annular recess 40.

The lowermost inner edge 14 of the downwardly-appending lip 30 is rounded so the free moving-head 75 has no sharp edges and does not cut or pinch the seal gasket 7 during installation, FIGS. 4, 5, and 7A-7C.

The bottom portion 11 of the downwardly-appending lip 30 is substantially flat and wide to allow a portion of the seal gasket 7 to entirely escape the annular recess 40 and move outwardly under the free moving-head 75 to provide a scratch barrier between the lip 30 and the workpiece being fastened, FIGS. 1A, 1B, 4, 5 and 7A-7C.

The outer edge 15 of the downwardly-appending lip 30 is rounded to allow a portion of the seal gasket 7 to entirely escape the free moving-head 75 without being cut or pinched, FIGS. 4, 5, and 7A-7C.

The outer edge 10 of the downwardly-appending lip 30 is angled outwards at an angle of 110 degrees from the outer edge 15 up to the peripheral edge 16, and is designed to create a "V" shape 95 laterally to protect the exposed seal gasket 7 from damage due to unloading snow and ice forces pushing the seal over the free-moving head peripheral edge 16 and therein tearing it apart from the installed fastener, FIGS. 1A and 5. The "V" shape 95 is created by the edge of the free-moving head 10 and the horizontal surface of the workpiece 19.

Figure 8B:
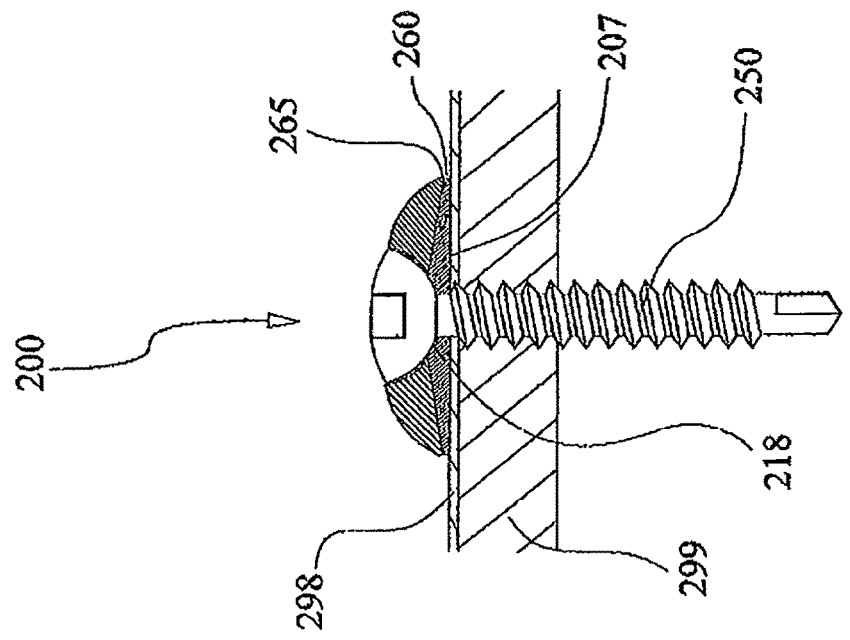
FIG. 8B is a side elevation view of the embodiment of fastener apparatus with self-leveling head fully assembled 200 of FIG. 8A installed to fasten a workpiece 298 to a substrate 299.
Figure 8A:
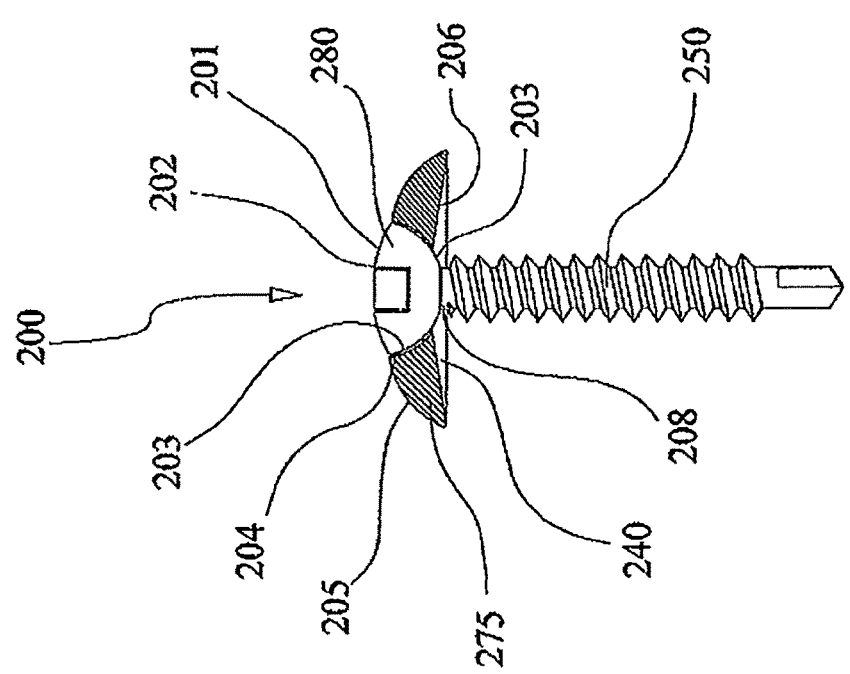
FIG. 8A is a side elevation view of an embodiment of fastener apparatus with self-leveling head fully assembled 200.

An embodiment of an embodiment of fastener apparatus with self-leveling head 200 is provided to shape a conical recess area 240, under the conical recess 206, to squeeze the rubber seal 207 inward towards the center of the threaded shank portion 250 to seal tightly around the ball head bottom 218 and the threadless zone on the shank 208, FIGS. 8A and 8B. This conical recess area 240 and the conical recess 206 protect the seal element 207 from ultra-violet rays and debris. The embodiment 200 has a preformed, flat top 201 of the head 280 of the threaded shank portion 250 to allow the toot fitting 202 to be punched, FIG. 8A, reducing tooling costs. A cup portion 204 accepts the ball head 203 and allows for the self-adjusting feature. Compression forces of the seal 207 and leverage from the peripheral edge 265 of the washer portion 205 act to keep the ball head 203 level. The top surface of the washer portion 205 is frusto-hemispherical in shape. When engaged to secure a workpiece 298 to a substrate 299, the rubber seal 260 stops expanding at the outer peripheral edge 265 of the washer portion 205, FIG. 8B. The outer peripheral edge 265 of the washer portion 205 is rounded to stop the rubber seal 207 from scratching the workpiece 298, FIG. 8B. The top seat element 6 of the embodiment of self-leveling apparatus 100 depicted in FIGS. 2A-5 is optional for the embodiment of fastener apparatus with self-leveling head 200 depicted in FIGS. 8A and 8B.

Figure 9B:
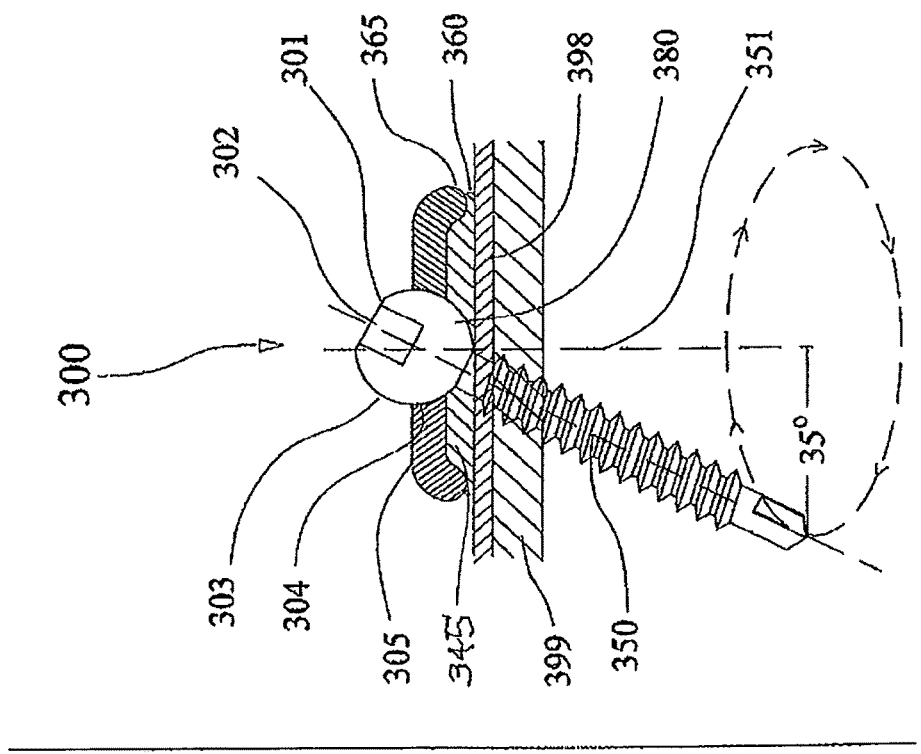
FIG. 9B is a side elevation view of the embodiment of fastener apparatus with self-leveling head fully assembled 300 of FIG. 9A installed to fasten a workpiece 398 to a substrate 399.
Figure 9A:
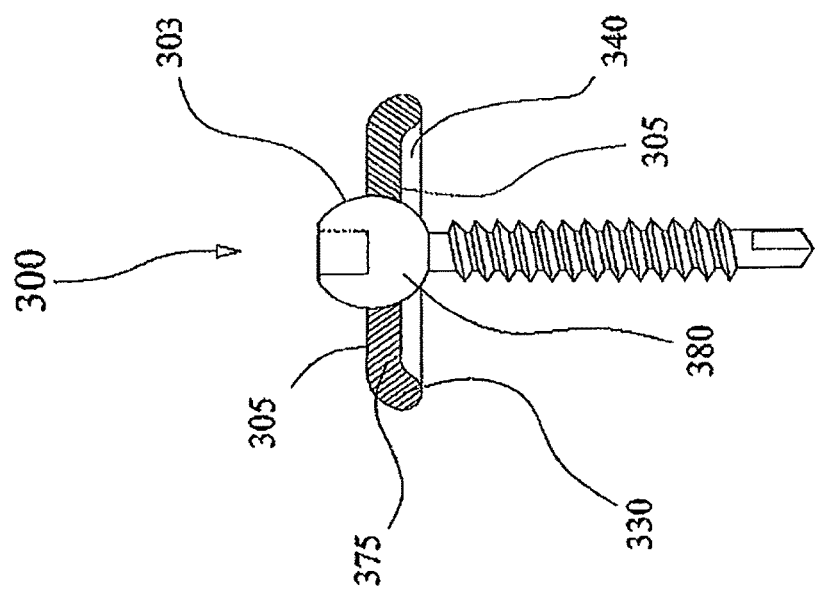
FIG. 9A is a side elevation view of an embodiment of fastener apparatus with self-leveling head fully assembled 300.

An embodiment of an embodiment of fastener apparatus with self-leveling head 300 is provided to shape a recess area 340 to squeeze the rubber seal 345 inward towards the center of the threaded shank portion 350 to seal tightly around the ball head 303 bottom portion 380, FIGS. 9A and 9B. The embodiment 300 has a preformed, flat top 301 of the ball head 303 of the threaded shank portion 350 to allow the tool fitting 302 to be punched, FIG. 9B, reducing tooling costs. The flat top 301 of the ball head 303 does not enter the cup portion 304 when the fastener is applied at an angle of up to 35 degrees in any direction from the vertical centerline, FIG. 9B. A cup portion 304 of the washer portion 375 accepts the ball head 303 and allows the self-adjusting feature. The washer portion 375 must be thick enough to provide strength to the cup portion 304 to accept the ball head 303 and remain durable enough to prevent the ball head 303 from pulling through the cup portion 304 under the pressure of installation. The ball head 303 is enlarged so the bottom of the ball head 380 makes first contact with the workpiece 398 and tightens the washer portion 375 and rubber seal 360 against the workpiece 398. The top surfaces 305 of the washer portion 375 are substantially flat and orthogonal to a central vertical axis 351 through the assembled fastener, FIG. 9B. When engaged to secure a workpiece 398 to a substrate 399, the rubber seal 345 stops expanding at the outer peripheral edge 365 of the washer portion 375, FIG. 9B. The outer peripheral edge 365 of the washer portion 375 is rounded and together with the compressed portion 360 of the rubber seal 345 the washer portion 375 is prevented from scratching the workpiece 398, FIG. 9B. The top seal element 6 of the embodiment of self-leveling apparatus 100 depicted in FIGS. 2A-5 is optional for the embodiment of fastener apparatus with self-leveling head 300 depicted in FIGS. 9A and 9B.

An embodiment of an embodiment of fastener apparatus with self-leveling head 400 is provided to shape a conical recess 440 to squeeze the rubber seal 460 inward towards the center of the threaded shank portion 450 to seal tightly around the ball head 403 and ball head bottom 480 at the head of the threaded shank portion 450, FIGS. 10A and 10B. The embodiment 400 has a preformed, flat top 401 of the ball head 403 to allow the tool fitting 402 to be punched, FIG. 10B, reducing tooling costs. The flat top 401 of the ball head 403 does not enter the cup portion 404 when the fastener is applied at an angle up to 35 degrees in any direction from the vertical centerline, FIG. 10A. A cup portion 404 of the conical washer portion 475 accepts the ball head 403 and allows for the self-adjusting feature. The conical washer portion 475 must be thick enough so the cup portion 404 is strong enough to accept the ball head 403 and remain durable enough to prevent the ball head 403 to pull through the cup portion 404 under the pressure of installation. The ball head 403 is enlarged so the bottom of the ball head 480 makes first contact with the workpiece 498 and tightens the conical washer portion 475 and seal 407 against the workpiece 498. The top surface 405 and bottom surface 411 of the washer portion 475 are essentially flat and parallel one to the other. The parallel arrangement of the top surface 405 and bottom surface 411 of the washer portion 475 are at an acute angle to a central vertical axis 451 through the assembled fastener, FIG. 10A. When engaged to secure a workpiece 498 to a substrate 499, the rubber seal 460 stops expanding at the outer peripheral edge 465 of the conical washer portion 475, FIG. 9B. The outer peripheral edge 465 of the washer portion 475 is rounded to stop the rubber seal 407, 460 from scratching the workpiece 498, FIG. 10B. The top seal element 6 of the embodiment of self-leveling apparatus 100 depicted in FIGS. 2A-5 is optional for the embodiment of fastener apparatus with self-leveling head 400 depicted in FIGS. 10A and 10B.

Figure 11B:
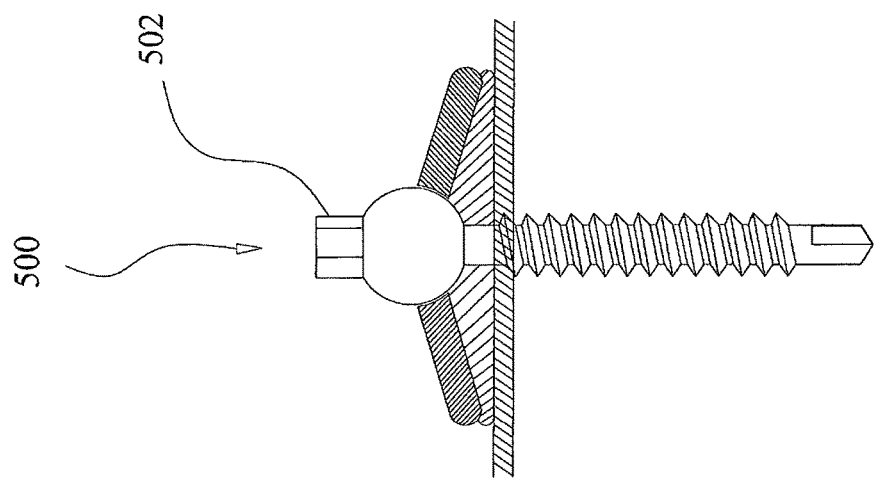
FIG. 11B is a side elevation view of the embodiment of fastener apparatus with self-leveling head fully assembled 500 of FIG. 11A installed to fasten a workpiece a substrate.
Figure 11A:
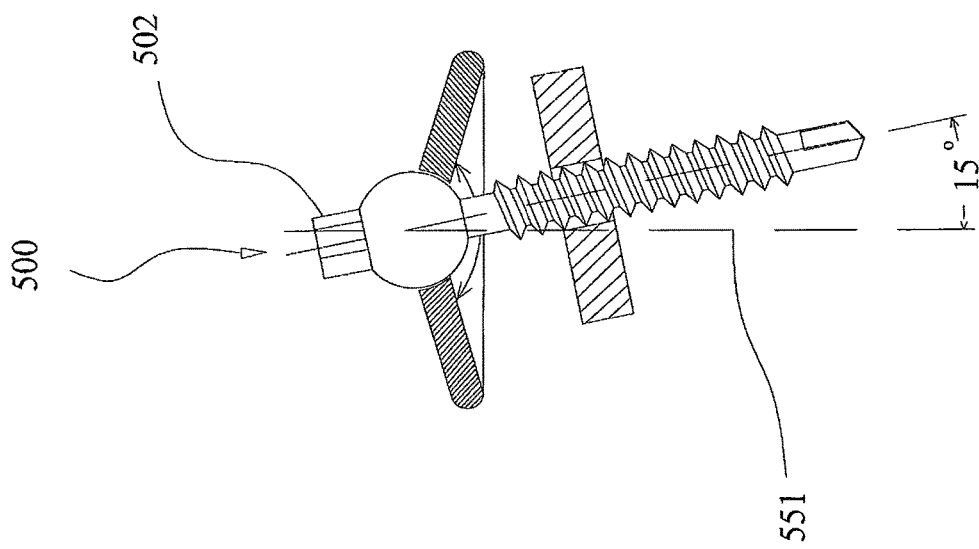
FIG. 11A is a side elevation view of an embodiment of fastener apparatus with self-leveling head fully assembled 500.

An embodiment of the conical washer fastener apparatus with self-leveling head 500, FIGS. 11A and 11B, has a raised hexagonal head tool fitting 502. The raised hexagonal head tool fitting 502 does not enter the cup portion when the fastener is applied at an angle, FIG. 11A. Other than the raised hexagonal head tool fitting 502, the embodiment of the conical washer fastener apparatus with self-leveling head 500 has the same features of fastener apparatus with self-leveling head 400, FIGS. 10A and 11B. The top seal element 6 of the embodiment of self-leveling apparatus 100 depicted in FIGS. 2A-5 is optional for the embodiment of fastener apparatus with self-leveling head 500 depicted in FIGS. 11A and 11B.

Figure 12:
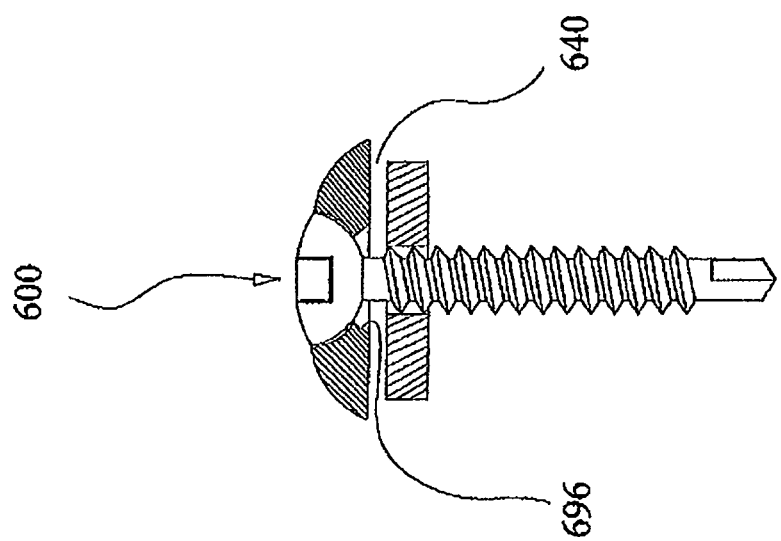
FIG. 12 is a side elevation view of an embodiment of fastener apparatus with self-leveling head fully assembled 600.

An embodiment of the fastener apparatus with self-leveling head 600, FIG. 12, has a flat bottom 640 with no recess, so any seal must be bonded to the flat bottom 640. A conical gap 696 is provided to allow the threaded shank to rotate and self-level the screw head. Other than the flat bottom 640 with no recess raised hexagonal head tool fitting 502 of the embodiment of FIGS. 11A and 11B, the embodiment of fastener apparatus with self-leveling head 600 has the same features of fastener apparatus with self-leveling head 200, FIGS. 8A-88B. The top seal element 6 of the embodiment of self-leveling apparatus 100 depicted in FIGS. 2A-5 is optional for the embodiment of fastener apparatus with self-leveling head 600 depicted in FIG. 12.

Figure 13:
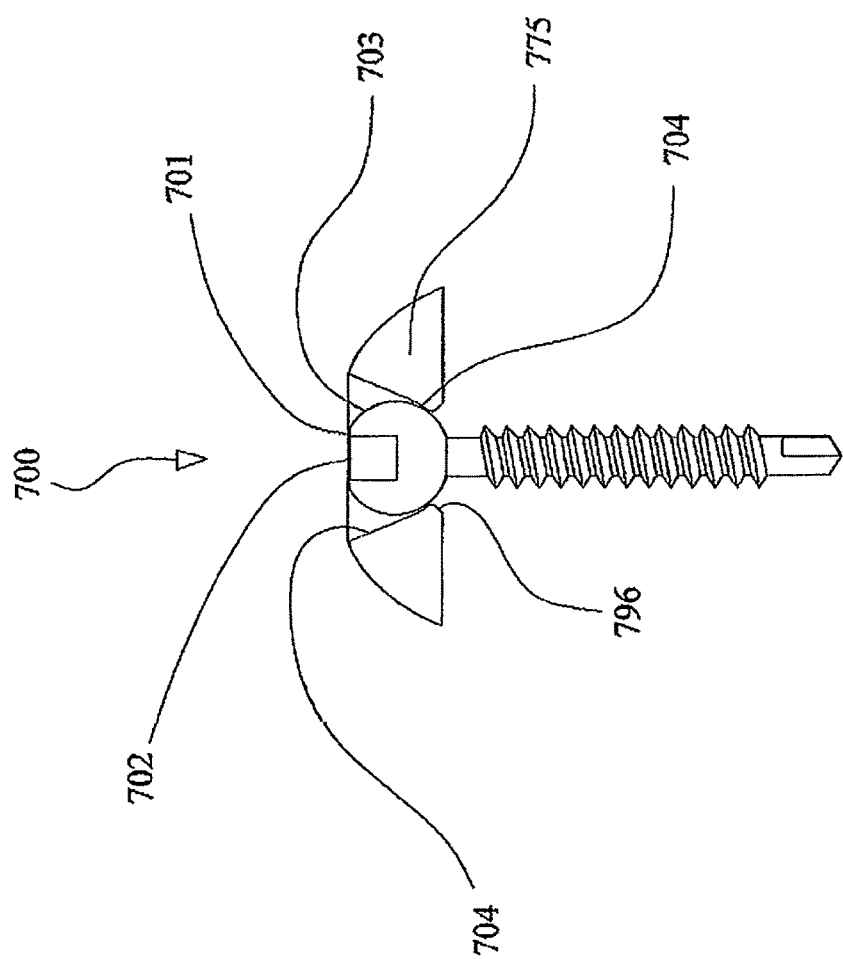
FIG. 13 is a side elevation view of an embodiment of fastener apparatus with self-leveling head fully assembled 700.

An embodiment of sheet metal screw fastener apparatus with self-leveling head 700 is provided, FIG. 13. The sheet metal screw embodiment 700 has a preformed, flat top 701 of the ball head 703 to allow the tool fitting 702 to be punched, reducing tooling costs. A cup portion 704 of the outer washer portion 775 accepts the ball head 703 and allows for the self-adjusting feature. The outer washer portion 775 must be thick enough so the cup portion 704 is strong enough to accept the ball head 703 and remain durable enough to prevent the ball head 703 to pull through the cup portion 704 under the pressure of installation. The cup portion of the outer washer 775 is cupped at the bottom, but tapered at the top. The top taper allows the threaded shank portion to be at an angle and still provide sufficient access to the tool fitting 702. A conical gap 796 is provided to allow the threaded shank to rotate and self-level the screw head.

Figure 14:
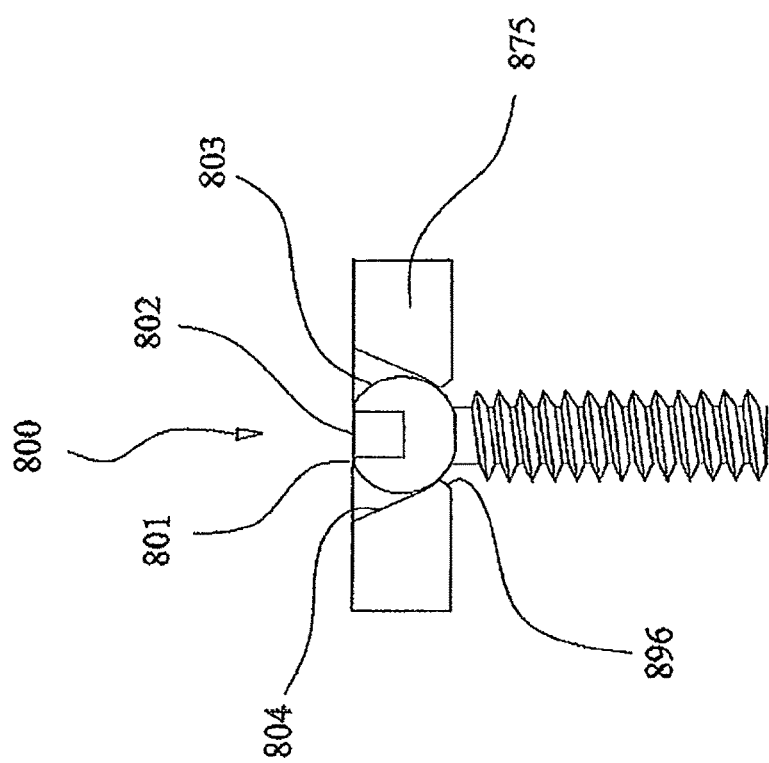
FIG. 14 is a side elevation view of an embodiment of fastener apparatus with self-leveling head fully assembled 800.

An embodiment of bolt fastener apparatus with self-leveling head 800 is provided, FIG. 14. The bolt embodiment 800 has a preformed, flat top 801 of the ball head 803 to allow the tool fitting 802 to be punched, reducing tooling costs. In this manner, a corresponding tool to fit countersunk fitting can be used instead of a wrench. Alternately, a raised hexagonal head tool fitting 502 of the self-leveling head embodiment 500, FIGS. 11A and 11B, can be employed for the bolt fastener apparatus with self-leveling head 800. A cup portion 804 of the outer washer portion 875 accepts the ball head 803 and allows for the self-adjusting feature. The outer washer portion 875 must be thick enough so the cup portion 804 is strong enough to accept the ball head 803 and remain durable enough to prevent the ball head 803 to pull through the cup portion 804 under the pressure of installation. The cup portion of the outer washer 875 is cupped at the bottom, but tapered at the top. The top taper allows the threaded shank portion to be at an angle and still provide sufficient access to the tool fitting 802. A conical gap 896 is provided to allow the threaded shank to rotate and self-level the screw head.

The disclosure provided herein is sufficient to enable one of ordinary skill in the art to practice the fastener apparatus with self-leveling head, and provides the best mode of practicing the fastener apparatus with self-leveling head presently contemplated by the inventors. While there is provided herein a full and complete disclosure of the preferred embodiment of the fastener apparatus with self-leveling head, it is not desired to limit the invention to the exact construction, dimensional relationships, and operation disclosed, shown, and/or described. Various modifications, alternative constructions, changes and equivalents will readily occur to those skilled in the art and may be employed, as suitable, without departing from the true spirit and scope of the fastener apparatus with self-leveling head. Such changes might involve alternative materials, components, structural arrangements, sizes, shapes, forms, functions, operational features, and the like.

Therefore, the above description and illustrations should not be construed as limiting the scope of the fastener apparatus with self-leveling head, which is defined by the appended claims.

We claim:

1. A free-moving, self-leveling-head fastener assembly for securing a workpiece, the fastener assembly comprising, in combination:
   (a) an enlarged ball head portion comprising a preformed and predetermined flat top surface height, the flat top surface comprising a raised hexagonal head tool fitting, an outer surface, a base portion, a peripheral edge, and a shank connected to the base portion, the shank comprising a screw threads and a tip;
   (b) a washer portion comprising a top surface, a bottom surface, a cup portion within the top and bottom surfaces sized to receive the enlarged ball head, and a rounded peripheral edge, and defining a washer recess beneath the washer bottom surface communicating with the enlarged ball head, and wherein the washer top surface and bottom surface are substantially flat and parallel one to the other and orthogonal to a central vertical axis through the assembled fastener; and
   (c) an annular gasket comprising a flat top surface, a flat bottom surface, and a central annular portion sized to receive and be carried on the enlarged ball head threaded shank portion and to receive the enlarged ball head base portion, whereby the annular gasket defines an uncompressed position contained radial within the washer recess providing a sea comprising a peripheral edge equal to the washer rounded peripheral edge, and whereby the annular gasket is adapted to further define a compressed position wherein the annular gasket top surface is compressed inward to seal around the enlarged ball head base portion and is not dependent on sealing around the shank threaded portion, whereby the annular gasket seals the entire washer recess and the annular gasket bottom surface is adapted to extend radially beyond the washer rounded peripheral edge;
whereas during installation of the enlarged ball head shank at an angle, the peripheral edge of the annular gasket contained below the peripheral edge of the washer portion makes contact with the workpiece and, due to the shape of the of the washer recess, the annular gasket cannot escape into the washer recess at this point of installation, thus the outer washer portion stops against the workpiece surface while the opposite peripheral edge of the washer portion has not yet made contact with the workpiece whereby the washer portion and annular gasket portion begin to self-level while the enlarged ball head is relatively high with respect to the annular gasket.

2. The fastener assembly of claim 1, wherein she assembly provides for a self-leveling enlarged ball head when the shank is adapted to be installed into a workpiece at an angle deviating up to 35 degrees from a central vertical axis through the assembled fastener.

3. The fastener assembly of claim 1, wherein the enlarged ball head flat top surface is preformed to aid in accurately centering and punching out a tool fitting in the manufacturing process.

4. The fastener assembly of claim 1, wherein the enlarged ball head flat top surface is pre-formed at a predetermined height to keep the flat top surface of the enlarged ball head portion from entering the washer cup portion when applied at a maximum angle thus preventing loss of contact between the enlarged ball head and washer cup and further preventing natural element ingress into the washer recess and deterioration of the annular gasket.

5. The fastener assembly of claim 1, wherein the enlarged ball head bottom protrudes deep into the washer recess in order to allow for contact between the enlarged ball head bottom and the annular gasket.

6. The fastener assembly of claim 5, wherein the annular gasket seal is not dependent on the annular gasket sealing against the enlarged ball head threaded shank portion.

7. The fastener assembly of claim 1 wherein the peripheral edge of the washer portion is completely rounded from the op surface to the bottom surface, whereby sliding snow and ice cannot catch on the peripheral edge of the washer portion, whereas the peripheral edge of the washer portion cannot scratch the workpiece, and whereas the peripheral edge of the washer portion cannot cut the compressed annular gasket extending out from under the washer recess to pierce the scratch barrier provided by the annular gasket between the peripheral edge of the washer portion and the workpiece.

8. A free-moving, self-leveling-head sheet meal screw fastener assembly for securing a workpiece, the fastener assembly comprising, in combination:
   (a) an enlarged ball head portion comprising a preformed and predetermined flat top surface height, the flat top surface comprising a raised hexagonal head tool fitting, an outer surface, a base portion, a peripheral edge, and a shank connected to the base portion, the shank comprising a screw threads and a tip;
   (b) a washer portion comprising a top surface, a bottom surface, a cup portion within the top and bottom surfaces sized to receive the enlarged ball head, and a rounded peripheral edge, and defining a washer recess beneath the washer bottom surface communicating with the enlarged ball head, and wherein the washer top surface and bottom surface are substantially flat and parallel one to the other and orthogonal to a central vertical axis through the assembled fastener; and
   (c) an annular gasket comprising a flat top surface, a flat bottom surface, and a central annular portion sized to receive and be carried on the enlarged ball head threaded shank portion and to receive the enlarged ball head base portion, whereby the annular gasket defines an uncompressed position contained radially within the washer recess providing a seal comprising a peripheral edge equal to the washer rounded peripheral edge, and whereby the annular gasket is adapted to further define a compressed position wherein the annular gasket top surface is compressed inward to seal around the enlarged ball head base portion and is not dependent on sealing around the shank threaded portion, whereby the annular gasket seals the entire recess and the annular gasket bottom surface is adapted to extend radially beyond the washer rounded peripheral edge;
whereas during installation of the enlarged ball head shank at an angle, the peripheral edge of the annular gasket contained below the peripheral edge of the washer portion makes contact with the workpiece and, due to the shape of the washer recess, the annular gasket cannot escape into the conical washer recess at this point of installation, thus the outer washer portion stops against the workpiece surface while the opposite peripheral edge of the washer portion has not yet made contact with the workpiece whereby the washer portion and and annular gasket portion begin to self-level while the enlarged ball head is relatively high with respect to the annular gasket.

9. The fastener assembly of claim 8, wherein the assembly provides for a self-leveling enlarged ball head when the shank is adapted to be installed into a workpiece at an angle deviating up to 35 degrees from a central vertical axis through the assembled fastener.

10. The fastener assembly of claim 8, wherein the enlarged ball head bottom protrudes deep into the washer recess in order to allow for contact between the enlarged ball head bottom and the annular gasket.

11. The fastener assembly of claim 8, wherein the enlarged ball head flat top surface is pre-formed at a pre-determined height to keep the flat top surface of the enlarged ball head portion from entering the washer cup portion when applied at a maximum angle thus preventing loss of contact between the enlarged ball head and washer cup and further preventing natural element ingress into the washer recess and deterioration of the annular gasket.

12. A free-moving, self-leveling-head bolt fastener assembly for securing a workpiece, the fastener assembly comprising, in combination:
   (a) an enlarged ball head portion comprising a preformed and predetermined flat top surface height, the flat top surface comprising a raised hexagonal head tool fitting, an outer surface, a base portion, a peripheral edge, and a shank connected to the base portion, the shank comprising a screw threads and a tip;
   (b) a washer portion comprising a top surface, a bottom surface, a cup portion within the top and bottom surfaces sized to receive the enlarged ball head, and a rounded peripheral edge, and defining a washer recess beneath the washer bottom surface communicating with the first enlarged ball head, and wherein the washer top surface and bottom surface are substantially flat and parallel one to the other and orthogonal to a central vertical axis through the assembled fastener; and
   (c) an annular gasket comprising a flat top surface, a flat bottom surface, and a central annular portion sized to receive and be carried on the first ball head threaded shank portion and to receive the first enlarged ball head base portion, whereby the annular gasket defines an uncompressed position contained radially within the washer recess providing a seal comprising a peripheral, edge equal to the washer rounded peripheral edge, and whereby the annular gasket is adapted to further define a compressed position wherein the annular gasket top surface is compressed inward to seal around the enlarged ball head base portion and is not dependent on sealing around the shank threaded portion, whereby the annular gasket seals the entire recess and the annular gasket bottom surface is adapted to extend radially beyond the washer rounded peripheral edge;
whereas during installation of the enlarged ball head shank at an angle, the peripheral edge of the annular gasket contained below the peripheral edge of the washer portion makes contact with the workpiece and, due to the shape of the washer recess, the annular gasket cannot escape into the washer recess at this point of installation, thus the outer washer portion stops against the workpiece surface while the opposite peripheral edge of the washer portion has not yet made contact with the workpiece whereby the washer portion and annular gasket portion begin to self-level while the enlarged ball head is relatively high with respect to the annular gasket.

13. The fastener assembly of claim 12, wherein the assembly provides for a self-leveling enlarged ball head when the shank is adapted to be installed into a workpiece at an angle deviating up to 35 degrees from a central vertical axis through the assembled fastener.

14. The fastener assembly of claim 12, wherein the enlarged ball head bottom protrudes deep into the washer recess in order to allow for contact between the enlarged ball head bottom and the annular gasket.

15. The fastener assembly of claim 12, wherein the enlarged ball head flat top surface is pre-formed at a pre-determined height to keep the flat top surface of the enlarged ball head portion from entering the washer cup portion when applied at a maximum angle thus preventing loss of contact between the enlarged ball head and washer cu, and further preventing natural element ingress into the washer recess and deterioration of the annular gasket.

* * * * *